(12) United States Patent
McSweeney et al.

(10) Patent No.: US 7,255,812 B2
(45) Date of Patent: Aug. 14, 2007

(54) METHOD OF MAKING HALOAPATITE PHOSPHORS

(75) Inventors: Robert T. McSweeney, Sayre, PA (US); Thomas M. Snyder, Laceyville, PA (US); Eric R. Mercer, Sayre, PA (US)

(73) Assignee: Osram Sylvania Inc., Danvers, MA (US)

(*) Notice: Subject to any disclaimer, the term of this patent is extended or adjusted under 35 U.S.C. 154(b) by 279 days.

(21) Appl. No.: 10/905,325

(22) Filed: Dec. 28, 2004

(65) Prior Publication Data

US 2006/0138386 A1 Jun. 29, 2006

(51) Int. Cl.
*C09K 11/73* (2006.01)
(52) U.S. Cl. .......................... 252/301.4 P; 252/301.4 H
(58) Field of Classification Search ......... 252/301.4 H, 252/301.4 P
See application file for complete search history.

(56) References Cited

U.S. PATENT DOCUMENTS 4,446,049 A * 5/1984 Pappalardo et al. .. 252/301.6 P
4,647,399 A * 3/1987 Peters et al. .......... 252/301.4 P

OTHER PUBLICATIONS

Mooney et al., *Alkaline Earth Phosphates*, Chemical Reviews, vol. 61, No. 5, (1961) 433-462.

\* cited by examiner

*Primary Examiner*—C. Melissa Koslow
(74) *Attorney, Agent, or Firm*—Robert F. Clark

(57) ABSTRACT

A method of making a haloapatite phosphor having a general formula represented by $(Ca_{(1-x-y)}Mn_xSb_y)_5(PO_4)_3(F_{(1-z-y)}Cl_zO_y)$, where $0<x<0.05$, $0.004<y<0.01$, and $0<z<0.1$. is provided. The method involves (a) formulating a blend of ingredients to make the haloapatite phosphor, the ingredients including $CaHPO_4$ as a primary source of calcium and phosphorus, (b) partially substituting an amount of an equimolar combination of an ammonium phosphate compound and calcium carbonate for an equal number of moles of $CaHPO_4$ in the formulation, (c) combining the ingredients in their formulated amounts to form the blend, and (d) firing the blend to form the haloapatite phosphor. The partial substitution has been found to increase the 100-hour brightness of the haloapatite phosphors.

15 Claims, No Drawings

METHOD OF MAKING HALOAPATITE PHOSPHORS

BACKGROUND OF THE INVENTION

Standard, dry-blended haloapatite phosphor formulations are based on supplementing the major calcium and phosphorus-supplying ingredient, dicalcium phosphate, $CaHPO_4$, (commonly referred to as Dical). This major ingredient comprises more than 65 weight percent of standard blends. Supplemental ingredients for Cool White and other similar color point haloapatite phosphors typically include $CaCO_3$, $CaF_2$, $MnCO_3$, $Sb_2O_3$ and $NH_4Cl$, listed in decreasing order of their weight fractions. These ingredients are blended in the correct proportions to provide a nearly stoichiometric compound, after firing, based on the generalized haloapatite phosphor composition $(Ca_{(1-x-y)}Mn_xSb_y)_5(PO_4)_3(F_{(1-z-y)}Cl_zO_y)$, where $0<x<0.05$, $0.004<y<0.01$, and $0<z<0.1$. For a haloapatite phosphor composition based on the Cool White color coordinates, the values of x, y and z are more particularly specified as $0.020<x<0.025$, $0.0045<y<0.0075$, and $0.04<z<0.08$. Some of the ingredients volatilize on firing, therefore excess amounts of these more volatile ingredients must be added in the formulation to compensate for their firing losses. Of these, $Sb_2O_3$ and $NH_4Cl$ are the most volatile and must be added in much greater proportions than what is actually retained in the phosphor.

SUMMARY OF THE INVENTION

It has been discovered that the 100-hour brightness of haloapatite phosphors may be improved by partially substituting an amount of an equimolar combination of an ammonium phosphate compound and calcium carbonate for an equal number of moles of $CaHPO_4$ in the formulation of the blended ingredients. Preferred ammonium phosphate compounds are diammonium phosphate (DAP), $(NH_4)_2HPO_4$, and monoammonium dihydrogen phosphate (MAP), $(NH_4)H_2PO_4$. More preferably, the ammonium phosphate compound is DAP. The substitution is preferably in the range of about 5 to about 20 mole percent. More preferably, the substitution is in the range of about 7.5 to about 12.5 mole percent, and, most preferably, about 10 mole percent. In Cool White haloapatite phosphors, a 10 mole percent substitution of ($DAP+CaCO_3$) can increase the 100-hour brightness up to about 1.7%. In all cases, the substitution described herein is based on the amount of $CaHPO_4$ initially formulated for the blend of ingredients used to achieve a haloapatite phosphor having a particular stoichiometry.

It is believed that the ammonium phosphate substitution lowers the temperature of the apatite crystal structure-forming reaction by supplying a transient, reactive liquid phase, $P_2O_5$, that is formed by the decomposition of the ammonium phosphate. This transient compound melts at 563° C. and its presence as a liquid phase at a relatively low temperature in the phosphor firing cycle allows many of the other ingredients to be dissolved and/or redistributed to form a more uniform final composition. This liquid phosphorus oxide phase finally reacts with $CaCO_3$ to form $Ca_2P_2O_7$ or with other ingredients to form other phosphate precursors for the apatite lattice. The onset of this decomposition melting reaction is presumed to form more uniform, less porous crystallites of haloapatite phosphor.

In accordance with one aspect of the invention, there is provided a method of making a haloapatite phosphor having a general formula represented by $(Ca_{(1-x-y)}Mn_xSb_y)_5(PO_4)_3(F_{(1-z-y)}Cl_zO_y)$, where $0<x<0.05$, $0.004<y<0.01$, and $0<z<0.1$. The method comprises: (a) formulating a blend of ingredients to make the haloapatite phosphor, the ingredients including $CaHPO_4$ as a primary source of calcium and phosphorus, (b) partially substituting an amount of an equimolar combination of an ammonium phosphate compound and calcium carbonate for an equal number of moles of $CaHPO_4$ in the formulation, (c) combining the ingredients in their formulated amounts to form the blend, and (d) firing the blend to form the haloapatite phosphor.

In accordance with another aspect of the invention, the method comprises: (a) combining ingredients in amounts formulated to produce the haloapatite phosphor, the ingredients including $CaHPO_4$, an ammonium phosphate, $CaCO_3$, at halogen source, an antimony source and, optionally, a manganese source, and (b) firing the combined ingredients to form the haloapatite phosphor.

DETAILED DESCRIPTION OF THE INVENTION

For a better understanding of the present invention, together with other and further objects, advantages and capabilities thereof, reference is made to the following disclosure and appended claims.

When formulating haloapatite phosphors, it is important to achieve a stoichiometric ratio of 5 to 3 between the calcium ions and phosphorus ions as well as a 5 to 1 ratio between the calcium ions and fluorine ions after firing. Here $Mn^{+2}$ and $Sb^{+3}$ are considered to be calcium-like in the formulation in that they substitute for $Ca^{+2}$ ions in the chemical formula and have been found to occupy calcium sites in the apatite crystal structure. Some of the chlorine, $Cl^{-1}$, i.e., the amount that is retained on firing, and some oxygen, $O^{-2}$, equal to the amount of retained antimony, are considered to be fluorine-like since they both substitute for fluorine, $F^{-1}$, in the above chemical formula. Here, $O^{-2}$ is retained at a halogen site that normally accommodates ions having a −1 charge in the apatite structure in order to charge compensate for an equal amount of $Sb^{+3}$ retained at a neighboring calcium site which would normally accommodate ions having a +2 charge (according to the Ouweltjies-model for antimony incorporation in haloapatite phosphors).

In addition to these stoichiometry considerations, the volatility of the ingredients must also be taken into account in formulating the blend of ingredients. If the composition is not stoichiometric after the removal of the excess volatile components, then the blend may also lose other ingredients by volatilization as well. For example if there is an excess amount of $CaF_2$ and a deficiency in the amount of $CaCO_3$, the blend can lose phosphorous, fluorine and chlorine by generating gaseous $POF_3$ or $POCl_3$. If insufficient $CaCO_3$ or $MnCO_3$ is present, these gaseous by-products will escape the cake during firing leading to the loss of both phosphorus and fluorine. The composition, however, can be designed to have an excess of both calcium and phosphorus provided they are balanced. The presence of extra calcium and phosphorus will result in the formation of a minor phase of calcium pyrophosphate, $Ca_2P_2O_7$. This minor phase is considered benign with respect to the phosphor's optical properties provided it is not present at too high a concentration, i.e., below 5 mole percent.

Establishing the correct stoichiometry in such formulations therefore requires a thorough understanding of the evaporation rates of the more volatile compounds in the blend under the firing conditions used to prepare the phosphor. Such rates may be determined empirically by methods known to those skilled in the art. Obtaining correct assays for all of the ingredients, especially for $CaHPO_4$ is equally important. Since $CaHPO_4$ comprises above 65 weight percent of the standard haloapatite blend, any assay errors will magnify deviations in the final stoichiometry of the phosphor. In the examples described herein, the assay for $CaHPO_4$ was set at 0.9780. This value presumes that the actual Dical used to formulate the blends is not the ideal compound, $CaHPO_4$, but rather has a composition which may be represented as $((1.030) CaO+(0.500) P_2O_5+(0.587) H_2O)$. While blends could be formulated based on an artificially constructed molecular weight amounting to 139.174 grams per mole with an attendant assay of 100%, the formulation used herein is based on a theoretical molecular weight of 136.015 grams per mole and an attendant assay of 0.9782. This allows the formulations to have unity phosphorus input and a slightly higher calcium input that can be easily dealt with by decreasing the amount of $CaCO_3$.

A group of six blends were formulated using the above Dical assay assumption and $NH_4Cl$ and $Sb_2O_3$ volatilization factors that were consistent with a relatively fast firing in a nitrogen furnace in uncovered boats. The blends were designed to either have standard formulation with no DAP substitution or to have 10 mole percent of their formulated amount of Dical replaced with an equimolar mixture of $((NH_4)_2HPO_4+CaCO_3)$. The DAP source used in the DAP-containing blends contained 2 weight % of tricalcium phosphate as a flow agent. The inclusion of this flow agent was accounted for in the overall blend stoichiometry. All blends were designed to achieve the same general stoichiometry, as defined by the relative amounts of (Ca+Mn+Sb), P and $(F+Cl+O_{Sb})$. In particular, the blends were designed to have a slight excess, 2.5 to 3.0 moles, of $Ca_2P_2O_7$. This means that (Ca+Mn+Sb) should be about 5.00 to 5.10 but preferably about 5.05 for a P input of 3.000 to 3.1000 and preferably 3.050. The excess amounts of (Ca+Mn+Sb) and P should be equal. A 0.050 excess of (Ca+Mn+Sb) with an equal excess of P would provide about 2.5 mole percent $Ca_2P_2O_7$ as a minor phase provided that $(F+Cl+O_{Sb})$ is at least 1.000 and preferably slightly larger at 1.005 to 1.030. The above proportions yield a (Ca+Mn+Sb)/P ratio of between 5.000/3.000 to 5.100/3.100, a $(Ca+Mn+Sb)/(F+Cl+O_{Sb})$ ratio of between 5.000/1.000 to 5.100/1.025, and a $P/(F+Cl+O_{Sb})$ ratio of between 3.000/1.000 to 3.100/1.030. The preferred (Ca+Mn+Sb)/P ratio is 5.040/3.040. The preferred $(Ca+Mn+Sb)/(F+Cl+O_{Sb})$ ratio is 5.040/1.010. And, the preferred $P/(F+Cl+O_{Sb})$ ratio is 3.040/1.010.

The number of moles of each ingredient used to formulate the test blends is given in Table 1. The firing cycle involves heating the blended ingredients in open trays over about 3 to 4 hours to a peak firing temperature of 1166° C., holding at the peak firing temperature for about 1 to 2 hours, and cooling to room temperature over about 2 to 4 hours in flowing nitrogen.

TABLE 1

Molar Amounts of Ingredients for Test Blends

| Compound | EPT-67 | EPT-68 | EPT-69 | EPT-79 | EPT-80 | EPT-81 |
|---|---|---|---|---|---|---|
| DAP sub. level | 0% | 0% | 0% | 10% | 10% | 10% |
| $CaHPO_4$ | 3.0550 | 3.0550 | 3.0550 | 2.7420 | 2.7420 | 2.7420 |
| $(NH_4)_2HPO_4$ | 0.0000 | 0.0000 | 0.0000 | 0.3120 | 0.3120 | 0.3120 |
| $CaCO_3$ | 1.3120 | 1.3070 | 1.3020 | 1.6350 | 1.6300 | 1.6260 |
| $CaF_2$ | 0.4675 | 0.4725 | 0.4775 | 0.4675 | 0.4725 | 0.4775 |
| $NH_4Cl$ | 0.1720 | 0.1590 | 0.1450 | 0.1810 | 0.1680 | 0.1550 |
| $MnCO_3$ | 0.1050 | 0.1050 | 0.1050 | 0.1030 | 0.1030 | 0.1030 |
| $Sb_2O_3$ | 0.0340 | 0.0340 | 0.0340 | 0.0330 | 0.0330 | 0.0330 |

As determined by x-ray fluorescence spectroscopy (XRF), all of the resulting phosphors retained fairly similar amounts of antimony. The manganese levels were slightly higher in the non-substituted standard blends, primarily since slightly more was added to these compositions. The retained chloride levels decreased with decreasing ammonium chloride levels. Slightly more antimony was retained in compositions having a higher input $Sb_2O_3$ level. The DAP-substituted phosphors were about 1 μm larger in average particle size than are those made without this substitution. All had very good brightness levels.

The above phosphors were coated into 40T12 fluorescent lamps. The photometric properties of the lamps were measured at the initial start-up (zero hours) and after 100 hours of operation. The test lamps were compared to a control lamp made with a standard Cool White phosphor. Since these lamps did not all have the same color point, some of the brightness differences are attributable to color shift relative to the color point of the control lamp. In order to accurately compare the lumen output of the lamps, the lumen gain due to color shift must be subtracted from the total lumen output of the test lamp. In particular, these color correction factors amounted to subtracting 0.0560% brightness for each 0.0010, or one block, that the test lamp was higher in its x color coordinate relative to the control and adding 0.3362% brightness for each 0.0010, or one block, that the test lamp was higher in its y color coordinate relative to the control. The color-corrected results are provided below in Table 2.

TABLE 2

Color-Corrected 100-Hr. Lumen Outputs

| Lamp | DAP sub. level | X | Y | 100-Hr Output | Output Due to Color Shift | Color Corr. 100-Hr Output | Color Corr. Output Diff. vs. Control |
|---|---|---|---|---|---|---|---|
| Control | 0% | 0.3832 | 0.3888 | 100.0% | 0.00% | 100.0% | 0.0% |
| EPT-67M | 0% | 0.3911 | 0.3950 | 105.1% | 1.63% | 103.4% | 3.4% |
| EPT-68M | 0% | 0.3907 | 0.3962 | 106.3% | 2.05% | 104.3% | 4.3% |
| EPT-69M | 0% | 0.3891 | 0.3990 | 106.9% | 3.10% | 103.8% | 3.8% |
| EPT-79M | 10% | 0.3893 | 0.3924 | 105.7% | 0.85% | 104.9% | 4.9% |
| EPT-80M | 10% | 0.3889 | 0.3940 | 107.3% | 1.41% | 105.9% | 5.9% |
| EPT-81M | 10% | 0.3862 | 0.3958 | 107.8% | 2.19% | 105.6% | 5.6% |

A comparison of the 100-hr lumen outputs for the color-corrected data in Table 2 demonstrates that the 100-hr output for the lamps containing the phosphors made from the DAP-substituted blends are 1.0% to 1.6% higher relative to the standard blends. The average 100-hour lumen increase relative to the control is 3.83% for the lamps containing the phosphors made from the three standard blends and 5.46% for lamps containing the phosphors made from the DAP-substituted blends. The 1.63% difference between these two average color-corrected brightness levels is attributable to the 10 mole percent substitution of $((NH_4)_2HPO_4+CaCO_3)$ for $CaHPO_4$.

Another group of phosphors was prepared to demonstrate that the substitution of $((NH_4)_2HPO_4+CaCO_3)$ for an equal number of moles of $CaHPO_4$ improved lamp brightness after 100 hours of operation. The compositions of the blends used to make the second set of phosphors are given below in Table 3 in terms of the number of moles of the ingredients. Here, all of the blends have equivalent $NH_4Cl$ and $Sb_2O_3$ input levels. Three blend compositions, CWLB160, CWLB161 and CWLB162 have a 10 mole % DAP substitution. One blend, CWLB-164, has a 5 mole % DAP substitution. The remaining blends, CWLB163, CWLB166, and CWLB167 are all standard formulations and therefore do not contain any DAP. The manganese level is increased in successively higher numbered blends in groups of the same type. When MnCO$_3$ is added, an equimolar amount of CaCO$_3$ is removed from the blend. Because of the increased manganese concentration, these blends yield phosphors having higher x and y color coordinates.

TABLE 3

Molar Amounts of Ingredients for Test Blends CWLB160-CWLB167

| Compound | CWLB 160 | CWLB 161 | CWLB 162 | CWLB 163 | CWLB 164 | CWLB 166 | CWLB 167 |
|---|---|---|---|---|---|---|---|
| DAP Sub. Level | 10% | 10% | 10% | 0% | 5% | 0% | 0% |
| CaHPO$_4$ | 2.742 | 2.742 | 2.742 | 3.054 | 2.898 | 3.054 | 3.054 |
| (NH$_4$)$_2$HPO$_4$ | 0.312 | 0.312 | 0.312 | 0.000 | 0.156 | 0.000 | 0.000 |
| CaCO$_3$ | 1.615 | 1.612 | 1.609 | 1.298 | 1.455 | 1.301 | 1.295 |
| CaF$_2$ | 0.473 | 0.473 | 0.473 | 0.473 | 0.473 | 0.473 | 0.473 |
| NH$_4$Cl | 0.165 | 0.165 | 0.165 | 0.165 | 0.165 | 0.165 | 0.165 |
| MnCO$_3$ | 0.099 | 0.102 | 0.105 | 0.102 | 0.102 | 0.099 | 0.105 |
| Sb$_2$O$_3$ | 0.033 | 0.033 | 0.033 | 0.033 | 0.033 | 0.033 | 0.033 |

All of the phosphors were prepared using the same lots of raw materials, fired at the same time and finished in a like manner. Finishing involved mortaring, sieving, wet ball milling and hot DTPA (diethylene triamine pentaacetic acid) washing to remove surface Mn. All of the phosphors had similar Sb and Cl levels after firing. The variation in Mn concentration allowed the blends to cover a range of x and y color coordinates. The phosphors were tested in 32T8 fluorescent lamps. Lamp brightness was again corrected for color point shifts relative to the control lamp using the same correction factors as applied in the previous set of test lamps. The color-corrected 100-hour lumen outputs are provided in Table 4.

TABLE 4

Color-Corrected 100-Hr. Lumen Outputs

| Lamp | DAP Sub. Level | x | y | 100-Hr Output | Output Due to Color Shift | Color Corr. % 100-Hr Output | Color Corr. Output Diff. vs. Control |
|---|---|---|---|---|---|---|---|
| Control | 0% | 0.3787 | 0.3840 | 100.0% | 0.0% | 100.0% | 0.0% |
| CWLB160M | 10% | 0.3780 | 0.3893 | 108.9% | 1.8% | 107.1% | 7.1% |
| CWLB161M | 10% | 0.3806 | 0.3901 | 110.5% | 1.9% | 108.6% | 8.6% |
| CWLB162M | 10% | 0.3830 | 0.3918 | 111.2% | 2.4% | 108.8% | 8.8% |
| CWLB163M | 0% | 0.3807 | 0.3905 | 108.2% | 2.1% | 106.1% | 6.1% |
| CWLB164M | 5% | 0.3804 | 0.3907 | 108.7% | 2.1% | 106.6% | 6.6% |
| CWLB166M | 0% | 0.3775 | 0.3894 | 108.3% | 1.9% | 106.4% | 6.4% |
| CWLB167M | 0% | 0.3825 | 0.3923 | 109.5% | 2.6% | 106.9% | 6.9% |

For these lamps, the average color-corrected lumen output for the lamps containing the phosphors made from the blends having the 10 mole % DAP substitution was 108.2% whereas the average color corrected lumen output for the lamps containing the phosphors made from the standard blends was 106.5%. The 1.7% difference between the average 100-hour outputs for these two groups of lamps is nearly identical to the 1.6% difference found for the first set of test lamps in Tables 1 and 2. The lamp containing the 5 mole % DAP-substituted phosphor had a color-corrected brightness of 106.6%. Since this represents only one data point, the result for the 5 mole % DAP substitution statistically is not significantly different from the standard blends. This suggests that DAP substitution levels greater than about 5 mole % may be needed to significantly improve 100-hour brightness.

The two lamp tests thus show that the substitution of an equimolar combination of (DAP+CaCO$_3$) for an equal number of moles of CaHPO$_4$ can improve phosphor performance in a lamp after 100 hours of operation. Similar results can be expected for other ammonium phosphate compounds.

While there has been shown and described what are at the present considered the preferred embodiments of the invention, it will be obvious to those skilled in the art that various changes and modifications may be made therein without departing from the scope of the invention as defined by the appended claims.

What is claimed is:

1. A method of making a haloapatite phosphor having a general formula represented by (Ca$_{(1-x-y)}$Mn$_x$Sb$_y$)$_5$(PO$_4$)$_3$ (F$_{(1-z-y)}$Cl$_z$O$_y$), where $0<x<0.05$, $0.004<y<0.01$, and $0<z<0.1$, the method comprising:
    (a) formulating a blend of ingredients to make the haloapatite phosphor, the ingredients including CaHPO$_4$ as a primary source of calcium and phosphorus;
    (b) partially substituting an amount of an equimolar combination of an ammonium phosphate compound and calcium carbonate for an equal number of moles of CaHPO$_4$ in the formulation;
    (c) combining the ingredients in their formulated amounts to form the blend; and
    (d) firing the blend to form the haloapatite phosphor.

2. The method of claim 1 wherein $0.020<x<0.025$ $0.0045<y<0.0075$, and $0.04<z<0.08$.

3. The method of claim 2 wherein the ammonium phosphate compound is diammonium phosphate and the partial substitution is about 10 mole percent.

4. The method of claim 1 wherein the ammonium phosphate compound is selected from diammonium phosphate and monoammonium dihydrogen phosphate.

5. The method of claim 1 wherein the partial substitution is in a range from about 5 to about 20 mole percent.

6. The method of claim 1 wherein the partial substitution is in a range from about 7.5 to about 12.5 mole percent.

7. A method of making a haloapatite phosphor having a general formula represented by $(Ca_{(1-x-y)}Mn_xSb_y)_5(PO_4)_3 (F_{(1-z-y)}Cl_zO_y)$, where $0<x<0.05$, $0.004<y<0.01$, and $0<z<0.1$, the method comprising:
   (a) combining ingredients in amounts formulated to produce the haloapatite phosphor, the ingredients including $CaHPO_4$, an ammonium phosphate compound, $CaCO_3$, a halogen source, an antimony source and a manganese source; and
   (b) firing the combined ingredients to form the haloapatite phosphor.

8. The method of claim 7 wherein the halogen source is a combination of calcium fluoride and ammonium chloride, the antimony source is antimony oxide and the manganese source is manganese carbonate.

9. The method of claim 8 wherein the ammonium phosphate compound is diammonium phosphate.

10. The method of claim 9 wherein $0.020<x<0.025$, $0.0045<y<0.0075$, and $0.04<z<0.08$.

11. The method of claim 7 wherein the ammonium phosphate compound is present in the combined ingredients in an amount from about 5 to about 20 mole percent based on the sum of the number of moles of the ammonium phosphate compound and the number of moles of $CaHPO_4$.

12. The method of claim 7 wherein the ammonium phosphate compound is diammonium phosphate.

13. The method of claim 12 wherein the diammonium phosphate is present in the combined ingredients in an amount from about 5 to about 20 mole percent based on the sum of the number of moles of the diammonium phosphate and the number of moles of $CaHPO_4$.

14. The method of claim 12 wherein the diammonium phosphate is present in the combined ingredients in an amount of about 10 mole percent based on the sum of the number of moles of the diammonium phosphate and the number of moles of $CaHPO_4$.

15. The method of claim 11 wherein $0.020<x<0.025$, $0.0045<y<0.0075$, and $0.04<z<0.08$.

* * * * *